United States Patent [19]

Gesemann et al.

[11] Patent Number: 5,786,048
[45] Date of Patent: Jul. 28, 1998

[54] PRINTING CYLINDER HAVING A FERROELECTRIC CERAMIC MATERIAL SURFACE

[75] Inventors: Hans-Jürgen Gesemann, Seufersbach; Lutz Seffner, Dresden; Andreas Schönecker, Dresden; Falko Schlenkrich, Dresden, all of Germany

[73] Assignee: Man Roland Druckmaschinen AG. Offenbach am Main, Germany

[21] Appl. No.: 658,515

[22] Filed: Jun. 10, 1996

[30] Foreign Application Priority Data

Jun. 10, 1995 [DE] Germany ............... 195 21 187.1

[51] Int. Cl.$^6$ ..................................... B41F 5/00
[52] U.S. Cl. ............. 428/34.6; 428/34.4; 501/134; 501/135; 501/136; 501/137; 101/DIG. 37; 101/328
[58] Field of Search ................. 501/134, 135, 501/136, 137; 428/34.4, 34.6; 101/328, DIG. 37

[56] References Cited

U.S. PATENT DOCUMENTS 4,712,156 12/1987 Bardhan .
4,772,985 9/1988 Yasumoto et al. .

FOREIGN PATENT DOCUMENTS

| 0666244 | 8/1985 | European Pat. Off. . |
| 0192779 | 9/1986 | European Pat. Off. . |
| 3835091 | 4/1990 | Germany . |
| 4127829 | 3/1993 | Germany . |
| 4325167 | 9/1994 | Germany . |
| 4416245 | 4/1995 | Germany . |
| 2241232 | 8/1991 | United Kingdom . |

OTHER PUBLICATIONS

WPI Abstract of JP 3141146, Oct. 26, 1989.
"Sol-gel Technology for Ferroelectric Thin Films"; Kim et al.; Ceram. Trans. vol. 43, 1994; pp. 123–129.
"Sol–Gel Processing and Characterization of Ferroelectric Films"; Hirano et al.; Ceram. Trans. vo. 25 1992, pp. 19–32.
"Sintering and Dielectric Properties of Single–Phase PB $(M_{g_{1/3}}Nb_{2/3})O_3$ –$PbTio_3$"; Katayama et al.; Journal of the European Ceramic Society; vol. 5, No. 3, Jan. 1989, pp. 183–191.
"Thin Films: Electrical Properties"; Lee et al.; I.S.A.F. '92, Proc. IEEE Int. Symp. Appl. Ferroelectric. 8th Jan. 1992, pp. 213–216.

*Primary Examiner*—Christopher Raimund
*Attorney, Agent, or Firm*—Cohen, Pontani, Lieberman, Pavane

[57] ABSTRACT

A ferroelectric ceramic material, for the storage of information in electrostatic printing processes, which ferroelectric ceramic material has a coercive force of less than 200 V/mm. The ferroelectric ceramic material consists of a ceramic perovskitic mixed crystal, which contains one or more components from each of Groups 1 and 2, whereby Group 1 contains the components $PbTiO_3$, $BaTiO_3$, $Pb(Fe_{1/2}Nb_{1/2})O_3$ and $Pb(Zn_{1/3}Nb_{2/3})O_3$ and Group 2 contains the components $Pb(Mg_{1/3}Nb_{2/3})O_3$, $Pb(Ni_{1/3}Nb_{2/3})O_3$, $Pb(Fe_{2/3}W_{1/3})O_3$ and $Pb(Mn_{1/2}Nb_{1/2})O_3$. The proportions of the components from the two groups in the mixed crystal are determined according to the following equation:

$$\sum_{i=1}^{j} X_i \times T_{ci} = T_{cM}$$

where $X_i$ is the mole fraction of the i-component, $T_{ci}$ is the Curie point of the i-component and $T_{cM}$ is the Curie point of the mixture between 50° C. and 100° C.

3 Claims, 1 Drawing Sheet

PRINTING CYLINDER HAVING A FERROELECTRIC CERAMIC MATERIAL SURFACE

FIELD OF THE INVENTION

The invention relates to the fields of information technology and ceramics and more particularly relates to a ferroelectric ceramic material, which is used, for example, for the storage of information in electrostatic printing processes.

DESCRIPTION OF THE PRIOR ART

In some cases, electrostatic printing processes take advantage of the ferroelectric property of the material being used. This can be, among other things, the mantle surface of the printing cylinder, which can consist of a polarized ferroelectric ceramic layer. In such cases, polarity reversal is achieved in certain areas of the mantle surface layer by means of electrical activation, resulting in the permanent storage of, for example, image information. The polarity reversal creates a charge image on the surface, which charge image absorbs electrically-charged ink particles from a toner during a subsequent development phase. The ink particles are then transferred to a printing stock. This basic process is described in German reference DE 38 35 091.

Primarily, the materials that can be used for storage are materials based on lead-titanium-zirconate, in the form of ceramic layers, which are applied using thin-layer technology (sol-gel process) as well as thick-layer technology.

Thin-layer PZT is used for storage purposes primarily on Si-substrates. Its use in printing technology has thus far not been possible, due to the large-area cylinder surface.

PZT materials for thick-layer technology, and processes related to this, are described in DE 44 16 245, DE 43 25 167 and DE 41 27 829. This prior art indicates that problems arise, in particular, at the following points:
the lead-oxide vaporization during sintering,
the transverse contraction of the layer, which should be kept as small as possible, and
the difficult seal sintering of the layers.

Because of these problems, it has thus far not been possible to use any "peak PZT" with high remanent polarization, especially at 50 Hz, with an almost rectangular hysteresis loop for large-area cylinder coatings. It is still impossible to completely reproduce the most advantageous values of compact materials on a large-area layer of the same material. For this reason, quality losses occur with layers of this type.

However, it is also impossible to produce a cylinder for a printing process from a compact PZT. This is because large-sized cylindrical bodies (tubes) can be produced only with large wall thicknesses. But large wall thicknesses mean that the polarity process and the inscribing of information must be carried out at high voltages. This is because of the high coercive force of the PZT, which is approximately 800 V/mm. For standard operation at 300 V, this would mean a cylinder wall thickness of roughly 0.2 mm. Even if a manufactured wall thickness of 5 mm were ground down to this extent (which would be a very expensive work step), the thin tube would not be stable, but instead would break under mechanical stress rather quickly.

In respect to mechanical stability, such a tube must have a wall thickness of at least 1 mm. This in turn requires a PZT that has coercive force of <200 V as well as all other favorable properties.

SUMMARY AND DESCRIPTION OF THE INVENTION

Accordingly, it is an object of the present invention to provide a ferroelectric ceramic material that, in addition to having high remanent polarization, connected to the occurrence of surface charges, is easy to polarize, particularly at 50 Hz ($P_r$ at 50 Hz should >13 $\mu C/cm^2$), has an almost rectangular hysteresis loop, high insulation resistance of >$10^{10}$ ohm×cm and low aging of the coupling coefficient, and a coercive force of less than 200 V/mm.

The ferroelectric ceramic material according to the invention consists of a ceramic perovskitic mixed crystal, which contains one or more components from the following Groups 1 and 2.

Group 1 contains:
$PbTiO_3$ (PT);
$BaTiO_3$ (BT);
$Pb(Fe_{1/2}Nb_{1/2})O_3$ (PFN); and
$Pb(Zn_{1/3}Nb_{2/3})O_3$ (PZN).

Group 2 contains:
$Pb(Mg_{1/3}Nb_{2/3})O_3$ (PMN);
$Pb(Ni_{1/3}Nb_{2/3})O_3$ (PNN);
$Pb(Fe_{2/3}W_{1/3})O_3$ (PFW); and
$Pb(Mn_{1/2}Nb_{1/2})O_3$ (PMnN).

The proportions of the components from the two groups in the mixed crystal are determined according to the following equation:

$$\sum_{i=1}^{j} X_i \times T_{ci} = T_{cM}$$

where $X_i$ is the mole fraction of the i-component,
$T_{ci}$ is the Curie point of the i-component, and
$T_{cM}$ is the Curie point of the mixture between 50° C. and 100° C.

The ferroelectric ceramic material advantageously contains PT in a share of 0.25 to 0.35 as a component from Group 1 and PMN at a share of 0.3 to 0.7 and PNN at a share of 0.3 to 0.65 as components from Group 2.

The ferroelectric ceramic material is advantageously used as a compact ceramic, foil or layer on a carrier.

Furthermore, the ferroelectric ceramic material can advantageously be used as a ceramic layer, sheet, roller, hollow cylinder or stamp.

DESCRIPTION OF THE PREFERRED EMBODIMENTS

Figure 1:
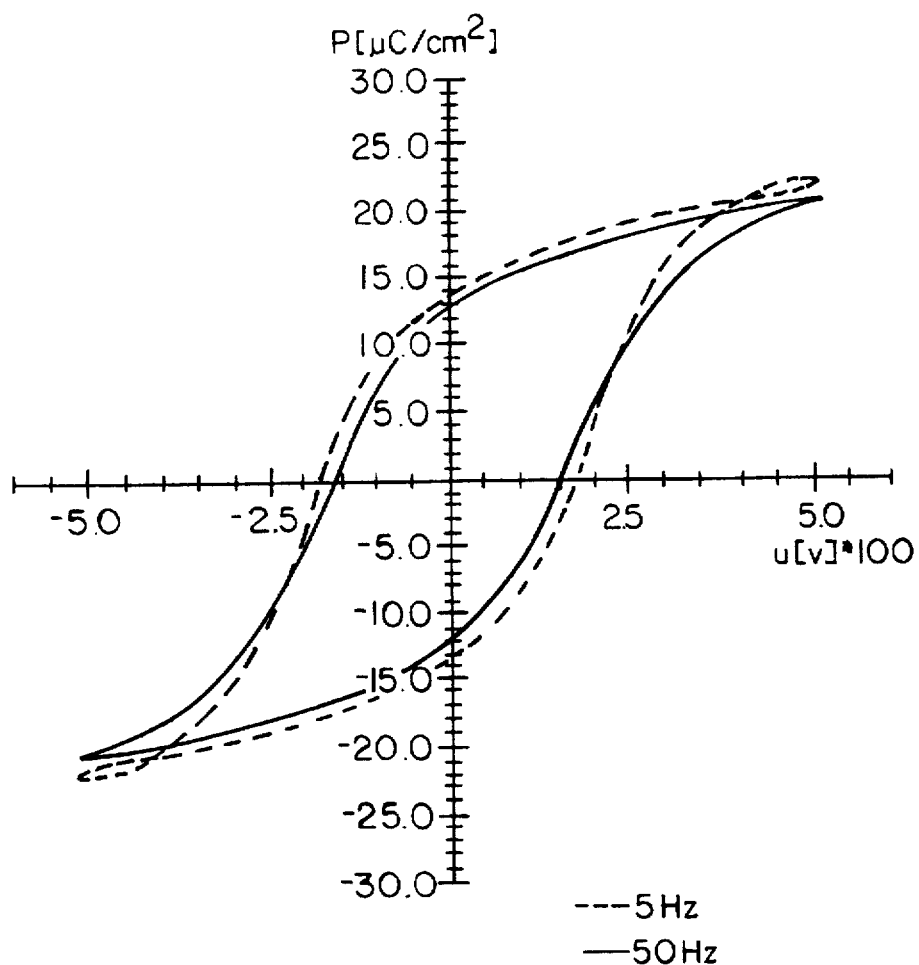
FIG. 1 shows a hysteresis loop for a ferroelectric ceramic material according to the present invention.

The mixed crystal according to the invention is made of components from two groups of materials. To reduce the coercivity of the required ferroelectric ceramic material, according to the invention one or more components from Group 1 that have a high Curie point and one or more components from Group 2 that have a low Curie point are used. The proportions of the respective components are determined according to the formula stated above. Depending on the particular purpose, the specific components that are used can be freely selected. However, the total of their Curie points multiplied by their respective shares must always result in a Curie point for the mixture between 50° C. and 100° C.

In each case, the "Curie point" refers here to the point at which the dielectric constant of the particular material, dependent on the temperature, is at a maximum.

For the mixed crystal according to the invention, all dopings, additives and substitutes known for complex perovskite can be used.

The invention is explained below in reference to several examples.

EXAMPLE

1. The selected perovskites of Groups 1 and 2 according to the invention are synthesized from the oxides or carbonates of the components $PbO(Pb_3O_4)$, $BaCO_3$, $ZnO$, $MgO$, $NiO$, $Nb_2O_5$, $WO_3$, $Fe_2O_3$, $TiO_2$ and $MnCO_3$. It is also possible to convert PbO with columbites, such as $NiNb_2O_6$, $MgNb_2O_6$, $ZnNb_2O_6$, etc. Furthermore, the instoichiometries known from the prior art (MgO surplus, etc.) can be used to prevent any undesired pyrochloric phase.
2. The synthesized perovskites are weighed-in according to the mole shares stated in Table 1.
3. The mixture is mixed for 6 hours in a pulverisette.
4. The mixture is then full-annealed for 4 hours at 850°–950° C.
5. After this, the mixture is finely ground for 6 hours in a pulverisette to a $D_{50}$ value of 1.2 μm.
6. The mixture is then shaped into tablets.
7. The tablets are sintered at 950°–1200° C. for 2 hours.
8. Finally, the sintered tablets are contacted:

Measuring contacts: Ag both sides

Tonering: one-sided basic electrode Ag

The Curie points of the ferroelectric ceramic materials used are listed in Table 2.

In all samples, Pr values of 12–16 μC/cm² were achieved. The hysteresis loops were well-formed. The coercive forces in all samples were generally below 200 V/mm.

FIG. 1 shows the results of Example 5. At 50 Hz, the coercive force is 170 V/mm. The Curie point in this example is 75° C.

As the Curie point drops, coercive force is reduced even further. At a Curie point of 60° C., coercive forces were already at 150 V/mm.

TABLE 1

| (all data in mole %) | | | | | | | | |
|---|---|---|---|---|---|---|---|---|
| | Group 1 | | | | Group 2 | | | |
| Example | PT | BT | PFN | PZN | PMN | PNN | PFW | PMnN |
| 1 | 15 | — | — | — | 85 | — | — | — |
| 2 | 20 | — | — | — | 80 | — | — | — |
| 3 | 30 | — | — | — | 10 | 60 | — | — |
| 4 | 20 | — | — | — | 50 | 30 | — | — |
| 5 | 30 | — | — | — | 20 | 50 | — | — |
| 6 | — | — | 85 | — | — | 8 | 7 | — |

TABLE 1-continued

| (all data in mole %) | | | | | | | | |
|---|---|---|---|---|---|---|---|---|
| | Group 1 | | | | Group 2 | | | |
| Example | PT | BT | PFN | PZN | PMN | PNN | PFW | PMnN |
| 7 | 30 | 5 | — | — | 20 | 45 | — | — |
| 8 | 25 | — | — | 10 | 15 | 40 | — | — |
| 9 | 20 | — | — | — | 70 | — | — | 10 |
| 10 | 28 | — | 5 | 5 | 20 | 20 | 22 | — |

TABLE 2

| Example | Curie point $T_c$ in °C. |
|---|---|
| 1 | 60 |
| 2 | 90 |
| 3 | 60 |
| 4 | 60 |
| 5 | 75 |
| 6 | 82 |
| 7 | 60 |
| 8 | 98 |
| 9 | 70 |
| 10 | 100 |

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

We claim:

1. A printing cylinder having an outer surface on which a ferroelectric ceramic material is mounted that consists of a ceramic perovskitic mixed crystal, which contains at least one component of Group 1 and at least one component of Group 2, Group 1 consisting of: $PbTiO_3$; $BaTiO_3$; $Pb(Fe_{1/2}Nb_{1/2})O_3$; and, $Pb(Zn_{1/3}Nb_{2/3})O_3$; and, Group 2 containing: $Pb(Mg_{1/3}Nb_{2/3})O_3$; $Pb(Ni_{1/3}Nb_{2/3})O_3$; $Pb(Fe_{2/3}W_{1/3})O_3$; and $Pb(Mn_{1/2}Nb_{1/2})O_3$, wherein the proportions of the components from the two groups in the mixed crystal are determined according to the following equation:

$$\sum_{i=1}^{i} X_i \times T_{ci} = T_{cM}$$

where $X_i$ is the mole fraction of the i-component, $T_{ci}$ is the Curie point of the i-component and $T_{cm}$ is the Curie point of the mixture wherein $T_{cm}$ is between 50° C. and 100° C.

2. A printing cylinder as defined in claim 1, wherein $PbTiO_3$ is contained in a share of 0.25 to 0.35 as a component of Group 1, and, $Pb(Mg_{1/3}Nb_{2/3})O_3$ is contained in a share of 0.3 to 0.7 and $Pb(Ni_{1/3}Nb_{2/3})O_3$ is contained in a share of 0.3 to 0.65 as components of Group 2.

3. A printing cylinder as defined in claim 1, wherein the ceramic material is arranged on the outer surface as one of a compact ceramic, a foil or a layer.

* * * * *